(12) United States Patent
Tango (10) Patent No.: US 12,250,031 B2
(45) Date of Patent: Mar. 11, 2025

(54) COMMUNICATION RELAY APPARATUS AND STORAGE MEDIUM STORING COMPUTER PROGRAM

(71) Applicants: KABUSHIKI KAISHA TOSHIBA, Tokyo (JP); Toshiba Infrastructure Systems & Solutions Corporation, Kawasaki (JP)

(72) Inventor: Toshihiro Tango, Fuchu Tokyo (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 18/153,983

(22) Filed: Jan. 12, 2023

(65) Prior Publication Data

US 2023/0308138 A1    Sep. 28, 2023

Related U.S. Application Data

(63) Continuation of application No. PCT/JP2021/009615, filed on Mar. 10, 2021.

(30) Foreign Application Priority Data

Jul. 13, 2020    (JP) ................. 2020-120027

(51) Int. Cl.
*H04B 7/026*    (2017.01)
*H04B 7/155*    (2006.01)

(52) U.S. Cl.
CPC ............. *H04B 7/026* (2013.01); *H04B 7/155* (2013.01)

(58) Field of Classification Search
CPC ...... H04B 7/026; H04B 7/155; H04B 7/0413; H04B 7/204; H04W 88/04; H04W 88/085; H04W 16/26; H04W 16/28; H04W 72/04
See application file for complete search history.

(56) References Cited

U.S. PATENT DOCUMENTS

| 6,308,085 B1 | 10/2001 | Shoki |
| 10,693,528 B1 | 6/2020 | Berlin |

(Continued)

FOREIGN PATENT DOCUMENTS

| JP | H11-261474 A | 9/1999 |
| JP | 2011-146882 A | 7/2011 |

(Continued)

OTHER PUBLICATIONS

Japan Patent Office, International Search Report in PCT Application No. PCT/JP2021/009615, 4 pages (Jun. 8, 2021).

(Continued)

*Primary Examiner* — David S Huang
(74) *Attorney, Agent, or Firm* — Finnegan, Henderson, Farabow, Garrett & Dunner, LLP (57) ABSTRACT

A communication relay apparatus and a storage medium storing a computer program that allow improvement of a quality of communication with a mobile station are provided. A communication relay apparatus includes a detector and a controller. The detector detects a mobile station located in a cover area formed by a plurality of remote units. The controller controls, for the remote units, communication resources used by the remote units for communication with the mobile station, based on a detection result of the detector.

6 Claims, 6 Drawing Sheets

(56) References Cited

U.S. PATENT DOCUMENTS

| | | | |
|---|---|---|---|
| 2011/0171944 A1 | 7/2011 | Kobayashi et al. | |
| 2012/0039320 A1 | 2/2012 | Lemson et al. | |
| 2015/0119079 A1* | 4/2015 | Tarlazzi | H04W 24/00 |
| | | | 455/456.1 |
| 2018/0294867 A1* | 10/2018 | Schwab | H04B 7/15557 |
| 2020/0374981 A1* | 11/2020 | Hoffmann | H04W 24/02 |
| 2022/0007151 A1 | 1/2022 | Shibata et al. | |

FOREIGN PATENT DOCUMENTS

| | | |
|---|---|---|
| JP | 2014-500635 A | 1/2014 |
| JP | 2014-209753 A | 11/2014 |
| JP | 6567438 B2 | 8/2019 |
| JP | 2020-77973 A | 5/2020 |
| WO | WO 2012/024345 A2 | 2/2012 |

OTHER PUBLICATIONS

Japan Patent Office, Decision to Grant a Patent in JP App. No. 2020-120027, 3 pages, and machine translation, 2 pages (Jan. 7, 2025).

\* cited by examiner

COMMUNICATION RELAY APPARATUS AND STORAGE MEDIUM STORING COMPUTER PROGRAM

CROSS REFERENCE TO RELATED APPLICATIONS

This application is a Continuation Application of PCT Application No. PCT/JP2021/009615, filed Mar. 10, 2021 and based upon and claiming the benefit of priority from Japanese Patent Application No. 2020-120027, filed Jul. 13, 2020, the entire contents of all of which are incorporated herein by reference.

FIELD

Embodiments described herein relate generally to a communication relay apparatus and a storage medium storing a computer program.

BACKGROUND

Beam forming is one of the technologies attracting attention in 5G (fifth generation mobile communication system). This is a function of cooperatively operating a plurality of antenna elements on one antenna and forming a beam of a radio wave in a discretionary direction, thereby realizing an increase in coverage or an increase in cell capacity by simultaneous communication with a plurality of users. Generally, the function is realized by combination with a massive multi-element antenna (Massive MIMO).

Incidentally, before 5G, a distributed antenna system (DAS system) was used as a measure for an indoor coverage of a mobile communication system. The DAS system relays communications between a mobile station and a base station, and includes a master unit and a plurality of remote units arranged in a distributed manner. The master unit distributes a signal of one base station to a plurality of remote units, and the remote units output the same downlink signal from the respective antennas, thereby constructing an area as one cell.

Demand for the DAS system has further increased along with the spread of the 5G system, and a further increase in demand for stability and improvement of communication quality is expected.

DETAILED DESCRIPTION

A communication relay apparatus according an embodiment includes a detector and a controller. The detector detects a mobile station located in a coverage area formed by a plurality of remote units. The controller controls, for the plurality of remote units, communication resources used by the remote units for communication with the mobile station, based on a detection result of the detector.

Hereinafter, a communication relay system according to an embodiment will be described with reference to the drawings.

Figure 1:
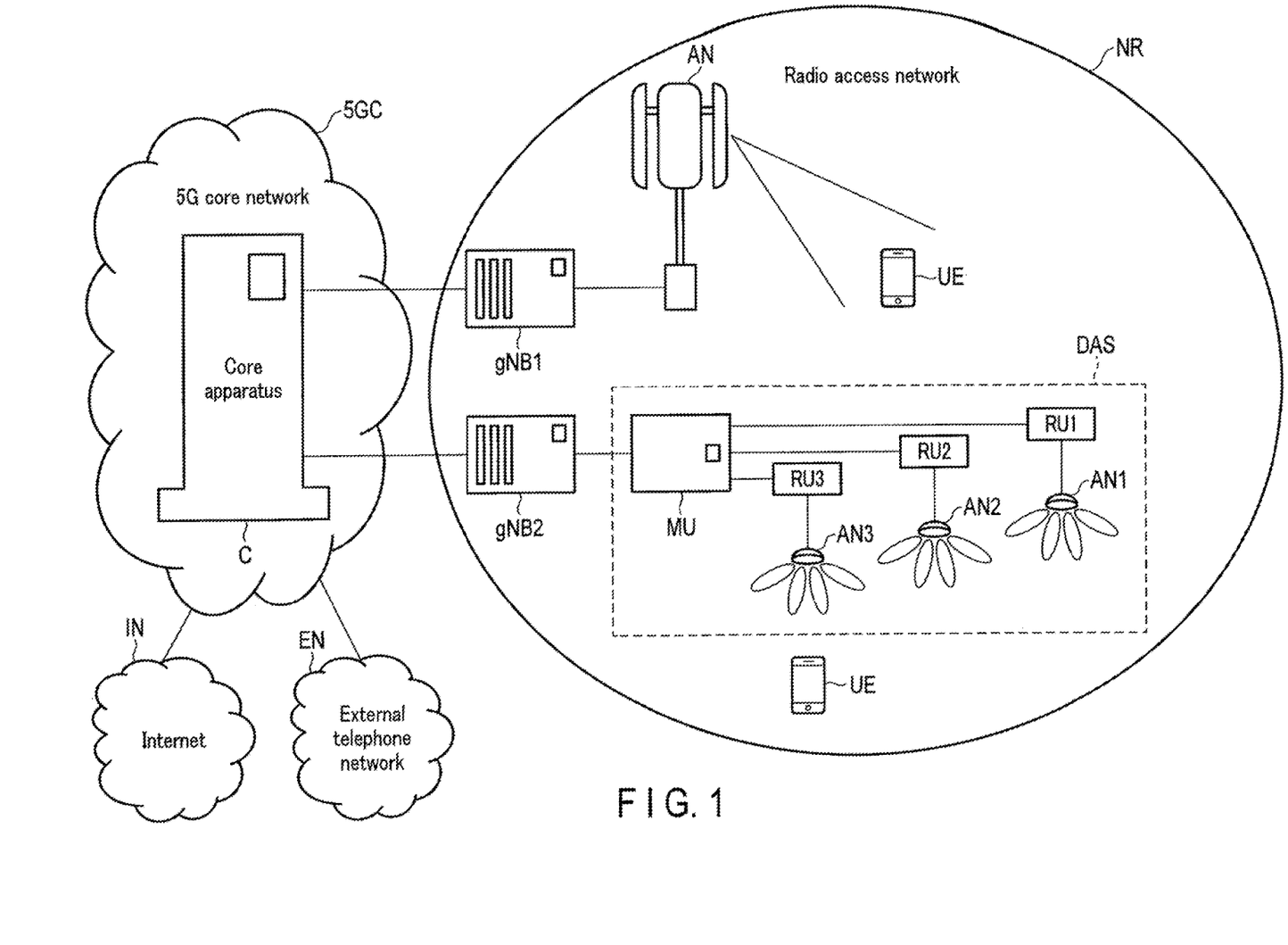
FIG. 1 is a diagram showing a mobile communication system including a communication relay system.

FIG. 1 shows a part of a fifth generation mobile communication system, so-called 5G. The mobile communication system includes a 5th generation core network (5G core network) 5GC and a radio access network New Radio (NR). In the example of FIG. 1, the radio access network NR includes a communication relay system.

The 5G core network 5GC controls the radio access network NR, collects traffic, performs communication between the collected traffic and an external network (the Internet IN, an external telephone network EN, or the like), and includes a core apparatus C as its center. The core apparatus C performs, for example, authentication/security management, session management, policy control, packet transfer, and the like.

On the other hand, the radio access network NR includes a plurality of base station apparatuses (for example, gNodeB (gNB)1 and gNB2 in FIG. 1). The base station apparatuses gNB1 and gNB2 are controlled by the core apparatus C, and each forms a radio communication area (a so-called cell) capable of communicating with mobile station user equipment (UE).

To be more specific, the base station apparatus gNB1 wirelessly communicates with the mobile station UE through an antenna apparatus AN provided on a roof of a building or a dedicated tower, and connects the mobile station UE to the 5G core network 5GC through the core apparatus C. In addition, the base station apparatus gNB1 performs beam forming by a massive MIMO which controls phases of signals in a large number of antenna elements on the antenna apparatus AN, and contributes to an increase in communication volume and the like.

The base station apparatus gNB2 has the same function as that of the base station apparatus gNB1, but wirelessly communicates with the mobile station UE through the distributed antenna system DAS instead of the antenna apparatus AN, and connects the mobile station UE to the 5G core network 5GC through the core apparatus C.

The distributed antenna system DAS is used in a special place to form a relatively small-scale radio communication area compared to that of the antenna apparatus AN (for example, an inside of a building, an underground mall, or other structures, a sparsely or densely populated area, an area in which tower construction is difficult or limited, and a site such as an event hall where the antenna apparatus AN is not permanently placed). As illustrated in FIG. 1, the distributed antenna system DAS includes a master unit MU, remote units RU1 to RU3, and antennas AN1 to AN3.

The master unit MU collectively controls each portion of the distributed antenna system DAS, and serves as a communication relay apparatus that enables the mobile station UE to communicate with the base station apparatus gNB2 via the antennas (AN1 to AN3) and the remote units (RU1 to RU3). In a case where the master unit MU is connected to each of the remote units RU1 to RU3 through an optical communication line, the master unit MU may be generally referred to as an optical repeater.

The antennas AN1 to AN3 are respectively connected to the corresponding remote units RU1 to RU3 in a one-to-one correspondence, each antenna being formed of a large number of antenna elements, and support a massive MIMO in which directivity is controlled (beam forming is performed) by adjusting phases of transmission RF signals and/or reception RF signals.

In this embodiment, in order to simplify the description, it is assumed that each of the antennas AN1 to AN3 perform beam forming to form a maximum of four beams at a time in arbitrary directions. Further, in order to simplify the description, it is assumed that the master unit MU, which will be described in detail later, processes (relays) a maximum of four streams corresponding to the four beams at a time.

In an actual apparatus, the maximum number is not limited to four, and may be three or less, or five or more. In addition, the number of beams formed by each of the antennas AN1 to AN3 is not fixed, and may be dynamically changed by, for example, changing the number of antenna elements to be used.

The remote units RU1 to RU3 are respectively connected to the corresponding antennas AN1 to AN3 in a one-to-one correspondence, and can be connected so as to be able to communicate with the master unit MU via an optical communication line. In addition, the remote units RU1 to RU3 can perform beam forming by phase adjustment on the corresponding antennas AN1 to AN3, respectively, and can also detect (search for) a direction in which the mobile station UE is located by measurement of reception intensity and beam forming.

More specifically, for the uplink, the remote units RU1 to RU3 perform phase adjustment (beam forming) on RF signals obtained by the corresponding antennas AN1 to AN3, and obtain reception RF signals respectively corresponding to four beams at a maximum. In the beam forming in the remote units RU1 to RU3, among the four beams at the maximum, beams corresponding to the number of streams allocated to each mobile station UE by the master unit MU are formed toward the mobile station UE. The remote units RU1 to RU3 down-convert the reception RF signals corresponding to the respective beams and simultaneously demodulate the reception RF signals into four reception signals respectively corresponding to four beams at the maximum. The remote units RU1 to RU3 serially bundle the respective demodulated reception signals, convert the reception signals from electrical signals into optical signals (modulate optical carriers), and transfer the optical signals to the master unit MU through the optical communication line. A stream included in the reception signal is referred to as a UL stream signal.

On the other hand, regarding the downlink, the remote units RU1 to RU3 convert optical signals transferred from the master unit MU through the optical communication line into electrical signals, and simultaneously demodulate the electrical signals into signals (hereinafter, referred to as DL stream signals) respectively corresponding to four streams at the maximum.

Then, the remote units RU1 to RU3 generate transmission RF signals obtained by modulating carriers using the DL stream signals, and output the transmission RF signals respectively to the antennas AN1 to AN3 connected thereto, to radiate the transmission RF signals into a space. Note that each of the remote units RU1 to RU3 can perform beam forming to simultaneously form four beams at a maximum, and each forms a beam for each DL stream signal to perform transmission. That is, in a case where four DL stream signals are obtained by demodulation, the remote units RU1 to RU3 form four beams and each beam transmits one DL stream signal.

Figure 2:
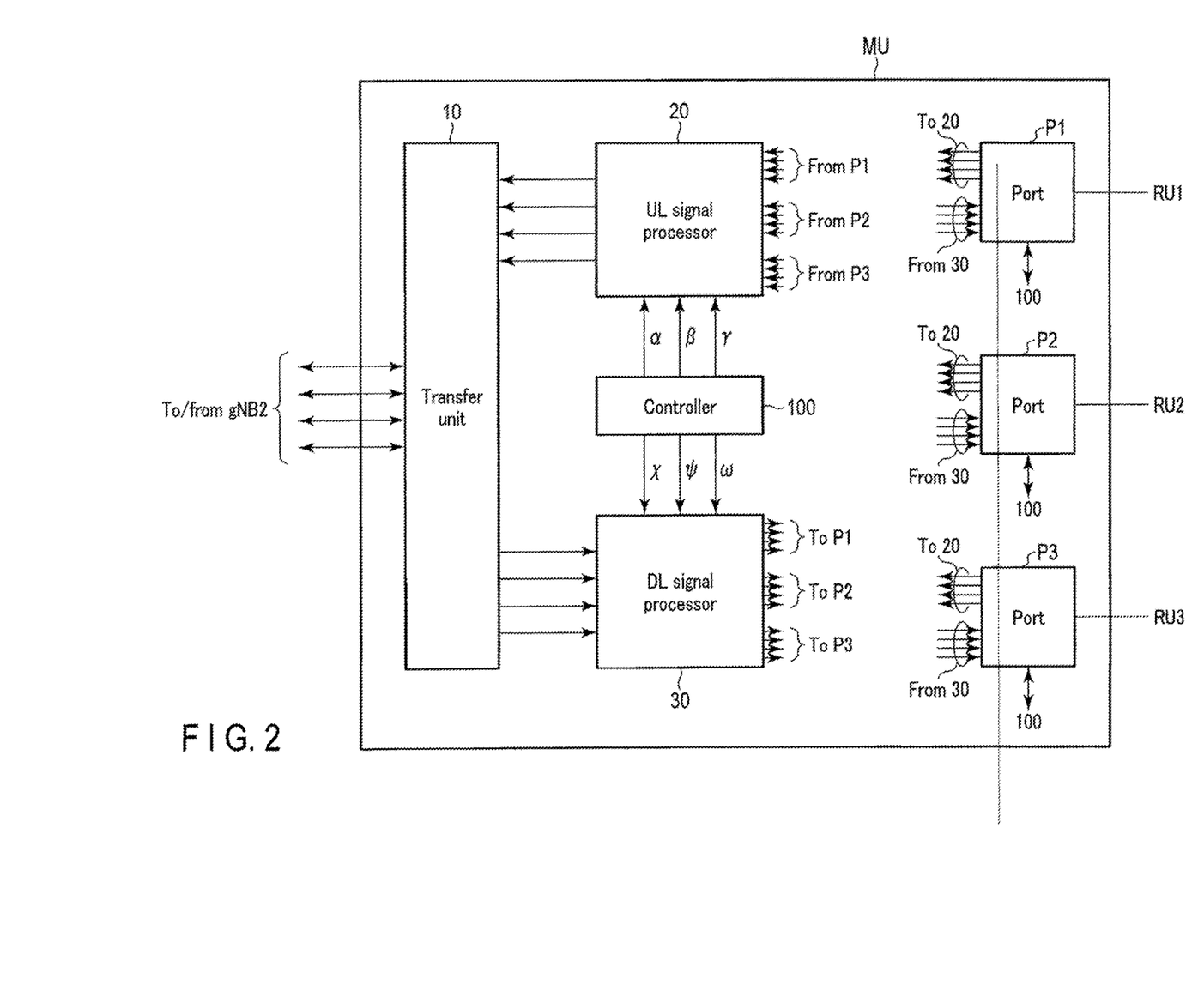
FIG. 2 is a diagram showing a configuration example of a master unit shown in FIG. 1.

Next, the master unit MU will be described in detail. FIG. 2 shows a configuration example of the master unit MU. The master unit MU includes ports P1 to P3, a transfer unit 10, an uplink (UL) signal processor 20, a downlink (DL) signal processor 30, and a controller 100.

The ports P1 to P3, respectively corresponding to the remote units RU1 to RU3, can be connected to the optical communication line in a one-to-one correspondence, and are connected to the UL signal processor 20 and the DL signal processor 30.

For the uplink, the ports P1 to P3 convert optical signals transmitted from the corresponding remote units RU1 to RU3 into electrical signals, demodulate the electrical signals into a maximum of four reception signals (reception signals of the respective beams demodulated by the remote units RU1 to RU3) corresponding to the beams, and output the demodulated reception signals in parallel. The demodulated reception signals are output to the UL signal processor 20.

The ports P1 to P3 function as an information acquirer that acquires, from the reception signals, information transmitted from the remote units RU1 to RU3, to monitor the demodulated reception signals, and detect a communication start request (PRACH) from the mobile station UE included in the reception signals and stream IDs allocated to the reception signals (UL stream signals). Further, the ports P1 to P3 function as a position detector, and detect a presence of the mobile station UE located in a coverage area formed by each of the remote units RU1 to RU3 from results of the aforementioned detection or the like. These detection results are reported to the controller 100.

On the other hand, for the downlink, four DL stream signals at a maximum are simultaneously input from the DL signal processor 30 to the ports P1 to P3. Then, the ports P1 to P3 serially bundle the input DL stream signals, convert the electrical signals into optical signals (modulate optical carriers), and transfer the optical signals to the corresponding remote units RU1 to RU3 through the optical communication line.

The transfer unit 10 accommodates a communication line connected to the base station apparatus gNB2 and communicates with the base station apparatus gNB2 through the communication line. To be more specific, for the uplink, the transfer unit 10 transfers UL signals (four signals at a maximum at a time) input from the UL signal processor 20 to the base station apparatus gNB2. On the other hand, for the downlink, the transfer unit 10 receives DL signals (four signals at a maximum at a time) transferred from the base station apparatus gNB2 through the communication line, and outputs the DL signals to the DL signal processor 30.

Under the control of the controller 100, the UL signal processor 20 performs a signal addition process of selectively adding the reception signals of the respective beams input from the ports P1 to P3, and outputs the resultant signal as a UL signal to the transfer unit 10. The signal addition process will be described in detail later.

Under the control of the controller 100, the DL signal processor 30 performs a signal distribution process of selectively distributing and outputting the DL signals input from the transfer unit 10 to the ports P1 to P3. The signal distribution process will be described in detail later.

The controller 100 is a control center that collectively controls each portion of the master unit MU. The controller 100 includes a memory (not shown) that stores a control program and control data, and a processor (not shown) that executes processing based on the control program and the control data, thereby realizing various control functions. Note that the control program may be provided by a storage medium other than the memory. Details of the control will be described later in the description of the operation.

Figure 3:
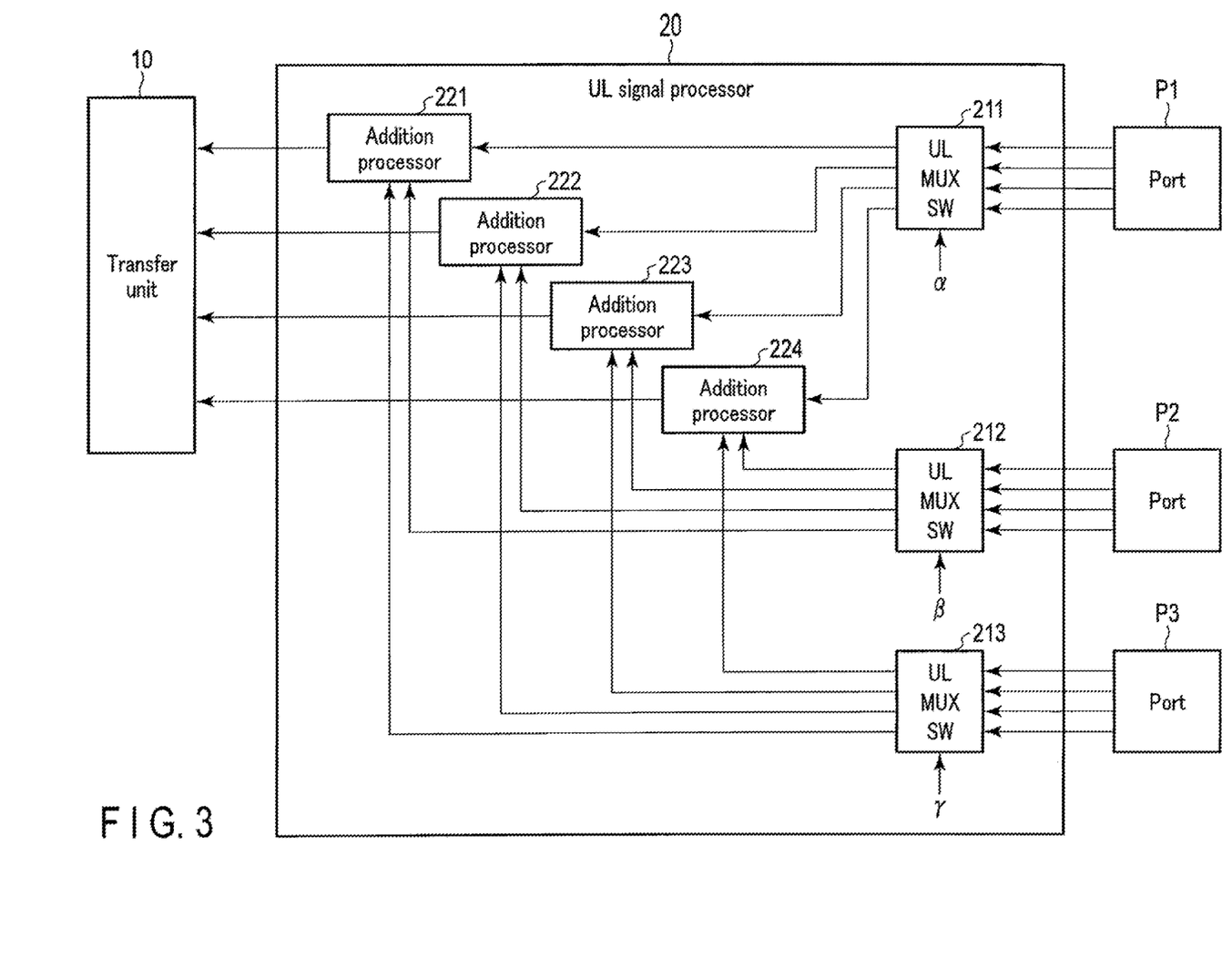
FIG. 3 is a diagram showing a configuration example of a UL signal processor shown in FIG. 2.

Next, a configuration example of the UL signal processor 20 will be described with reference to FIG. 3.

The UL signal processor 20 includes uplink multiplexer switches (UL MUX SW) 211 to 213 and addition processors 221 to 224.

The UL MUX SW 211 to 213 are in one-to-one correspondence with the ports P1 to P3, respectively, receive four reception signals at a maximum output from the ports P1 to P3, respectively, selectively multiplex these signals in accordance with UL switching signals α, β, and γ from the controller 100, and output the multiplexed signals.

Figure 4:
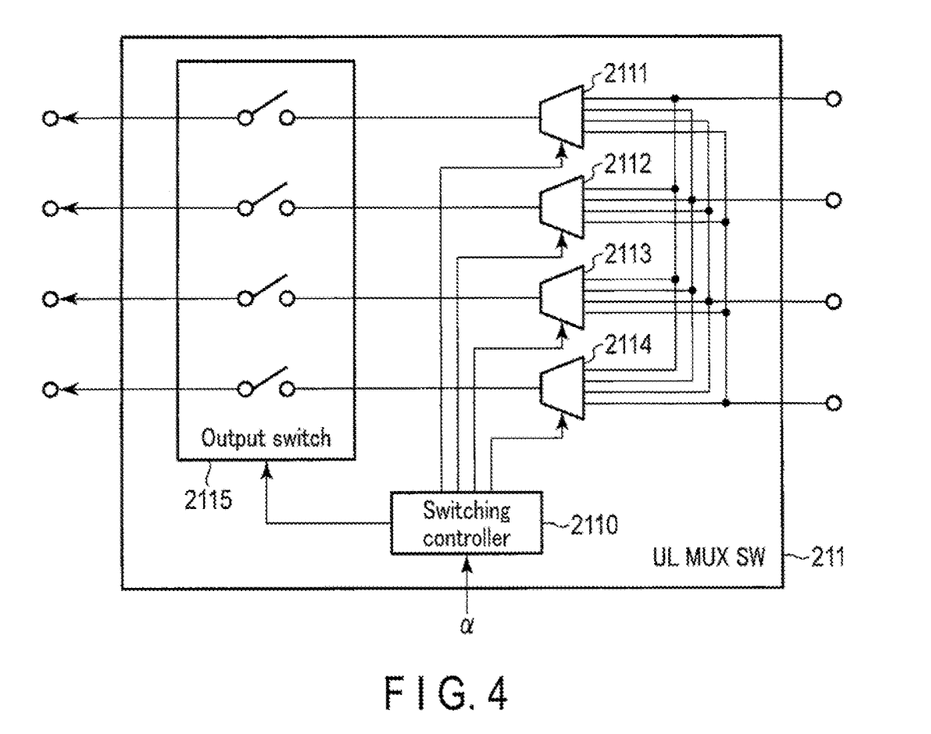
FIG. 4 is a diagram showing a configuration example of a UL MUX SW shown in FIG. 3.

Here, a configuration example of the UL MUX SW 211 will be described with reference to FIG. 4. The configurations of the UL MUX SW 212 and 213 are the same, and thus the description thereof will be omitted. However, the UL switching signals α, β, and γ may be different from one another.

The UL MUX SW 211 includes a switching controller 2110, multiplexers 2111 to 2114, and an output switch 2115.

Each of the multiplexers 2111 to 2114 includes four input terminals, and four reception signals at a maximum output from the port P1 are input thereto. Then, in accordance with an instruction from the switching controller 2110, the input reception signals are selectively multiplexed and output to the output switch 2115 as multiplexed reception signals.

The output switch 2115 includes four independent switches corresponding to the multiplexers 2111 to 2114, and multiplexed reception signals are input from the corresponding multiplexers 2111 to 2114 to the respective switches. Then, in accordance with an instruction from switching controller 2110, the multiplexed reception signals are output from the output terminals of the switches. These output terminals serve as output terminals of the UL MUX SW 211.

The switching controller 2110 controls the multiplexers 2111 to 2114 and the output switch 2115 in accordance with the UL switching signal α from the controller 100 to control multiplexing and output. That is, under the control in accordance with the UL switching signal α, a maximum of four reception signals output from the port P1 are selectively multiplexed, and outputs and destinations of the multiplexed reception signals are controlled.

Reference is again made to FIG. 3. Each of the addition processors 221 to 224 includes three input terminals and is connected to one of four output terminals of each of the UL MUX SW 211 to 213, and the multiplexed reception signals are input to the three input terminals. Then, the addition processors 221 to 224 add (combine) a maximum of three multiplexed reception signals and output the added multiplexed reception signals to the transfer unit 10 as UL signals.

Figure 5:
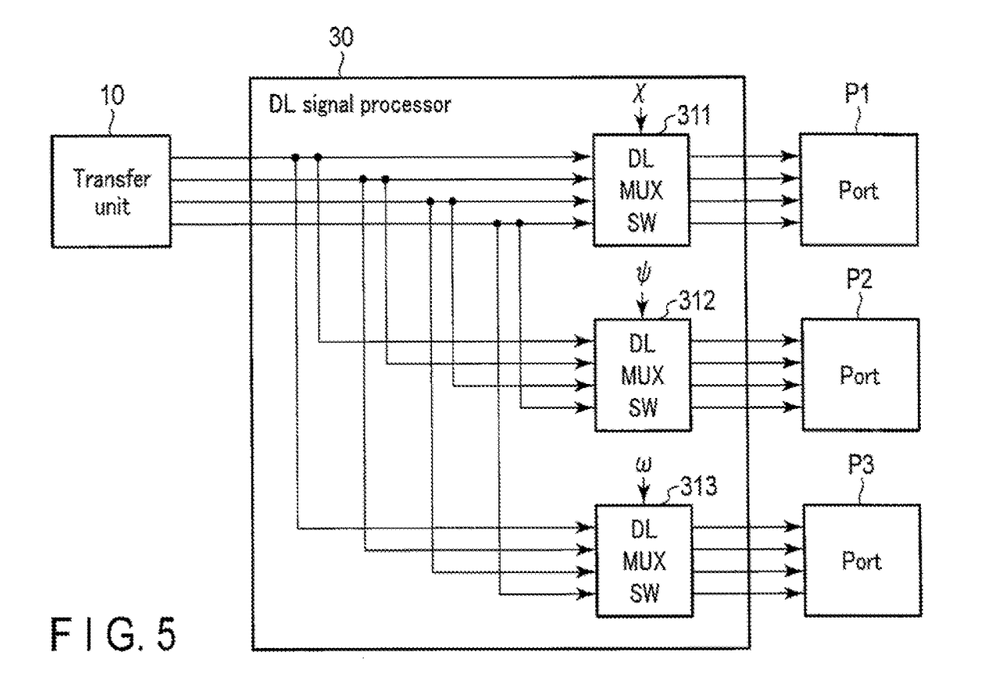
FIG. 5 is a diagram showing a configuration example of a DL signal processor shown in FIG. 1.

Next, a configuration example of the DL signal processor 30 will be described with reference to FIG. 5.

The DL signal processor 30 includes downlink multiplexer switches (DL MUX SW) 311 to 313.

The DL MUX SW 311 to 313 are in one-to-one correspondence with the ports P1 to P3, respectively, receive four DL signals at a maximum output from the transfer unit 10, selectively multiplex these DL signals in accordance with DL switching signals χ, ψ, and ω from the controller 100, and output the multiplexed signals to the corresponding ports P1 to P3. The DL MUX SW 311 to 313 may output signals without multiplexing.

Figure 6:
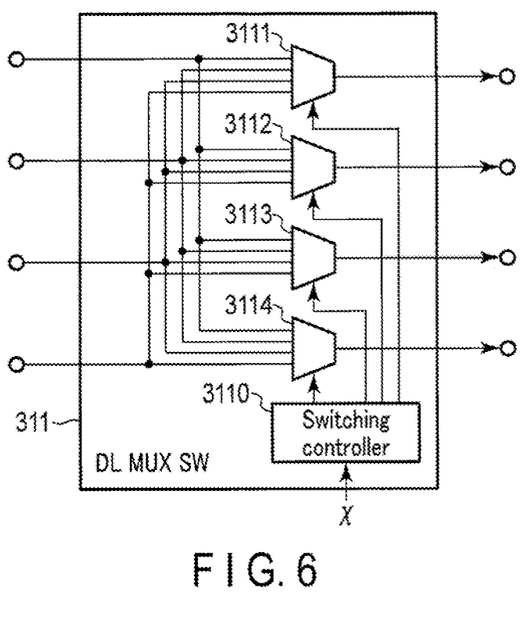
FIG. 6 is a diagram showing a configuration example of a DL MUX SW shown in FIG. 5.

A configuration example of the DL MUX SW 311 will be described with reference to FIG. 6. The configurations of the DL MUX SW 212 and 313 are the same, and thus the description thereof will be omitted. However, the DL switching signals χ, ψ, and ω may be different from one another.

The DL MUX SW 311 includes a switching controller 3110 and multiplexers 3111 to 3114.

Each of the multiplexers 3111 to 3114 includes four input terminals, and four DL signals at a maximum output from the transfer unit 10 are distributed and input to the multiplexers. Then, in accordance with an instruction from the switching controller 2110, the multiplexers 3111 to 3114 selectively multiplex the input DL signals and output the multiplexed signals as one signal. The multiplexers 3111 to 3114 respectively correspond to four input terminals of the port P1 in a one-to-one correspondence, and output a signal obtained by the multiplexing to the corresponding input terminals of the port P1.

The switching controller 3110 controls the multiplexers 3111 to 3114 in accordance with the DL switching signal χ from the controller 100 to control multiplexing and output. That is, under the control of the switching controller 3110 in accordance with the DL switching signal χ, a maximum of four DL signals can be selectively multiplexed and output to any or all of the four input terminals of the port P1.

Figure 7:
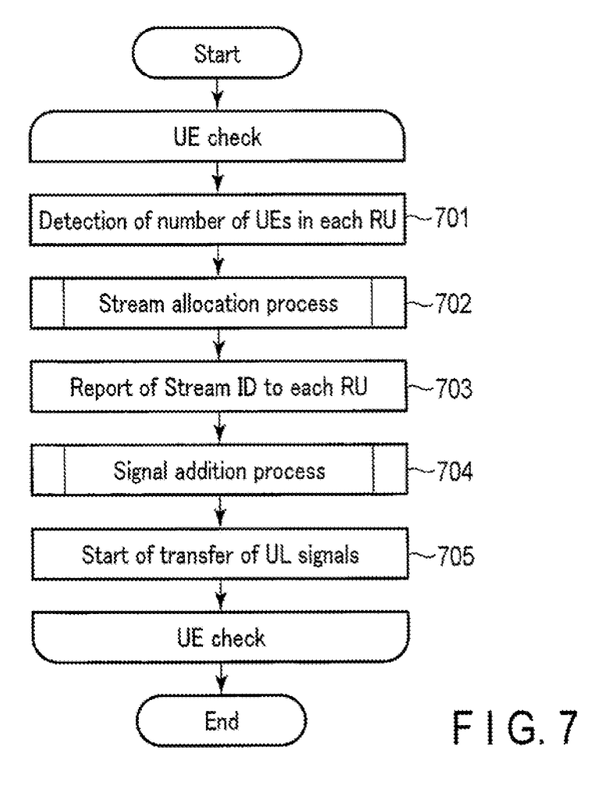
FIG. 7 is a flowchart for explaining processing of the master unit shown in FIG. 1.

Next, the operation of the communication relay system will be described. In the following description, the operation of the distributed antenna system DAS will be described in particular. FIG. 7 is a flowchart for explaining a control flow of the controller 100 of the master unit MU.

At the start of the operation of the distributed antenna system DAS, the controller 100 executes the processing illustrated in FIG. 7, monitors detection results reported from the ports P1 to P3, and monitors communication (communication start, communication in progress, and communication end) through each of the remote units RU1 to RU3. That is, the controller 100 monitors and stands by for a generation of a communication start request from the mobile station UE located in the coverage area formed by each of the remote units RU1 to RU3 or an end of a communication session performed by the mobile station UE in the coverage area.

For example, if the mobile station UE located in the coverage area of the remote unit RU1 transmits a communication start request, the communication start request is received by the antenna AN1 and the remote unit RU1, and the communication start request reaches the port P1 of the master unit MU through the optical communication line. As an example of the communication start request, a signal such as a physical random access channel (PRACH) is conceivable.

The port P1 at which the communication start request arrived detects the generation of the communication start request and reports the detection to the controller 100. The controller 100 recognizes that the port which reported the detection is the port P1, and proceeds to step 701.

In the above description, the case where the communication start request through the remote unit RU1 is detected has been described as an example. However, the remote unit RU2 (or RU3) also performs a report in a similar operation from the port P2 (or P3), and the controller 100 recognizes that the report was received from P2 (or P3).

In an initial state of the operation of the distributed antenna system DAS, the master unit MU distributes and outputs the DL signal from the base station apparatus gNB2 to each of the remote units RU1 to RU3 for the downlink stream. In addition, the remote units RU1 to RU3 in the initial state form beams in the same direction and transmit DL signals according to the same algorithm. However, as an initial setting, it is also possible to apply different settings to the remote units RU1 to RU3 so as to form beams in a predetermined direction.

In step 701, the controller 100 acquires detection results from all of the ports P1 to P3, counts the number of mobile stations UE in a state of communication in progress for each of the remote units RU1 to RU3 based on the detection results, and proceeds to step 702.

As a method of counting the number of mobile stations UE in a state of communication in progress, for example, the PRACH transmitted from the mobile station UE to the base station apparatus gNB2 may be monitored by the ports P1 to P3 or the controller 100, and the number of PRACHs may be counted for each of the remote units RU1 to RU3 by distinguishing the mobile stations UE.

In step 702, the controller 100 executes a stream allocation process, and then proceeds to step 703. To be more specific, in accordance with a predetermined stream allocation algorithm, the controller 100 allocates the streams ID1 to ID4 to the mobile stations UE that made the communication start request and the mobile stations UE that are already in communication, and proceeds to step 703. For the mobile stations UE that are already in communication, the stream IDs to be allocated are reviewed, but may not be changed.

The stream allocation algorithm may be determined in consideration of various factors. For example, the stream IDs to be allocated to the respective mobile stations UE are determined based on the number of streams that can be processed by the master unit MU (four in this example), the number of the remote units accommodated by the master unit MU (three, corresponding to RU1 to RU3, in this example), the number of the mobile stations UE located in the coverage area of each of the remote units RU1 to RU3 (for example, the number of PRACHs recognized by the controller 100), the maximum number of streams between the master unit MU and each of the remote units RU1 to RU3 (four in this example), the maximum number of streams between each of the remote units RU1 to RU3 and the mobile stations UE (four in this example), communication qualities of the respective resources, types of communication used by the mobile stations UE, communication capabilities of the mobile stations UE, and the like.

Among these items of information, the information on the master unit MU and the remote units RU1 to RU3 may be stored in a storage unit (not shown) of the master unit MU in advance. The information on the remote units RU1 to RU3 and the mobile stations UE may be dynamically acquired by the controller 100 from the remote units RU1 to RU3 and the mobile stations UE through the ports P1 to P3.

In step 703, the controller 100 reports the stream IDs allocated to the mobile stations UE in step 702 to each of the remote units RU1 to RU3, and proceeds to step 704. To be specific, the controller 100 reports to each of the remote units RU1 to RU3, for example, the identification information of the mobile stations UE and the allocated stream IDs in association with each other.

Here, each of the remote units RU1 to RU3 that received the report secures a communication resource corresponding to the number of reported stream IDs for each mobile station UE, and establishes a communication link with each mobile station UE according to a predetermined procedure.

In step 704, the controller 100 performs the signal addition process on the four signals output from each of the ports P1 to P3 based on the stream IDs allocated to the mobile stations UE in step 702, thereby generating four UL signals, and proceeds to step 705.

In the signal addition process, four signals output from each of the ports P1 to P3 are selectively added to generate four UL signals, and the addition process is performed by excluding a part or all of the signals not including the streams transmitted from the mobile stations UE. Accordingly, at least a signal including a stream transmitted from a mobile station UE is included in one of the four UL signals.

To be more specific, based on the stream IDs allocated to the mobile stations UE in step 702, the controller 100 generates the UL switching signals $\alpha$, $\beta$, and $\gamma$ for adding the signals corresponding to the allocated stream IDs among the four signals output from each of the ports P1 to P3, and controls the signal addition process of the UL signal processor 20.

In step 705, the controller 100 controls the UL signal processor 20 and the transfer unit 10 to start transferring the four UL signals obtained by the signal addition process of the UL signal processor 20 to the base station apparatus gNB2 by the transfer unit 10, and terminates the process.

Thereafter, the controller 100 starts the processing shown in FIG. 7 again, monitors detection results reported from the ports P1 to P3, and monitors communication (communication start, communication in progress, and communication end) for each of the remote units RU1 to RU3. If a communication start request is generated from the mobile station UE located in the coverage area formed by each of the remote units RU1 to RU3 or the communication session performed by the mobile station UE in the same coverage area is terminated, the controller 100 executes the processing of step 701 and subsequent steps again.

Next, with reference to FIG. 8, the operation will be described using a specific example.

Figure 8:
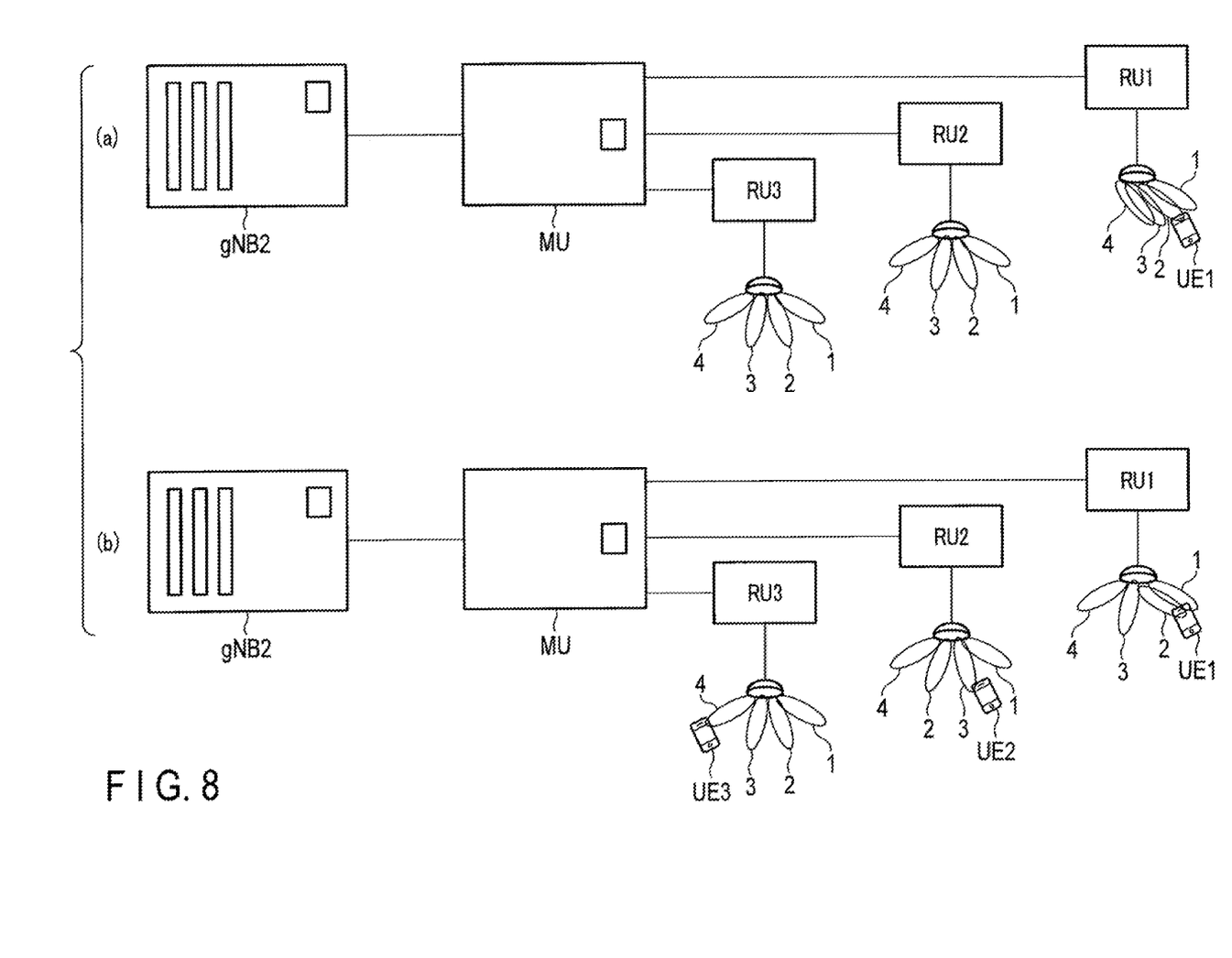
FIG. 8 is a diagram for explaining an operation example of a distributed antenna system.

As shown in FIG. 8(a), a case is considered in which the mobile station UE1 that requests communication is present only in the coverage area of the remote unit RU1 among the remote units RU1 to RU3, that is, a case in which a communication start request is transmitted from the mobile station UE1 and there is no mobile station in the coverage areas of the other remote units RU2 and RU3.

In this case, the controller 100 recognizes that the mobile station UE1 is present only in the coverage area of the remote unit RU1 based on the detection result of each of the ports P1 to P3 obtained in step 701, allocates, for example, all of the four streams ID1 to ID4 to the remote unit RU1 by the stream allocation algorithm of step 702, and allocates no streams to the remaining remote units RU2 and RU3.

Accordingly, the remote unit RU1 reports that the streams ID1 to ID4 are allocated to the mobile station UE1 in step 703, secures communication resources for the four streams (UL stream signals), and establishes a communication link for communicating with the mobile station UE1 using the four streams in accordance with a predetermined procedure. To be more specific, in order to receive the four UL stream signals, the remote unit RU1 forms all of the four beams that can be formed by the antenna AN1, that is, the beams respectively corresponding to the streams ID1 to ID4, in the direction toward the mobile station UE1.

On the other hand, in the master unit MU, since the streams ID1 to ID4 are allocated to the mobile station UE1 in step 702, the controller 100 recognizes that the streams allocated to the remote unit RU1 are the streams ID1 to ID4 and no streams are allocated to the remaining remote units RU2 and RU3, and generates the UL switching signals $\alpha$, $\beta$, and $\gamma$ for adding signals corresponding to the allocated stream IDs.

At this time, the UL switching signal $\alpha$ is a signal for instructing the UL MUX SW 211 to output four signals input from the port P1 and respectively corresponding to four beams of the remote unit RU1 to the corresponding addition processors 221 to 224.

On the other hand, the UL switching signal β is a signal for instructing the UL MUX SW 212 not to output some or all of the four signals input from the port P2 and respectively corresponding to four beams of the remote unit RU2 to the addition processors 221 to 224. Similarly, the UL switching signal γ is a signal for instructing the UL MUX SW 213 not to output some or all of the four signals input from the port P3 and respectively corresponding to four beams of the remote unit RU3 to the addition processors 221 to 224.

As a result, the addition processors 221 to 224 respectively output the signals of the four streams ID1 to ID4 of the remote unit RU1 input from the port P1 to the transfer unit 10, with little or no addition of signals from the other remote units RU2 and RU3. In this way, in the addition processors 221 to 224, addition of a signal that is not expected to be used for communication to a signal that is actually used for communication is suppressed.

Next, an example shown in FIG. 8(b) will be described.

In this example, one mobile station UE (UE1, UE2, UE3) is located in each of the coverage areas of the remote units RU1 to RU3. Alternatively, it may be considered that the mobile stations UE2 and UE3 moved from the state shown in FIG. 7(a) (only the mobile station UE1 is present) to the respective coverage areas of the remote units RU2 and RU3 (or that the mobile stations UE2 and UE3 that were originally located in the respective coverage areas of the remote units RU2 and RU3 made a communication start request from a state in which they are not communicating).

In this case, based on the detection result of each of the ports P1 to P3 obtained in step 701, the controller 100 recognizes that one mobile station UE (UE1, UE2, and UE3) is located in each of the coverage areas of the remote units RU1 to RU3, and that each of the three mobile stations requests communication. Then, the controller 100 allocates, for example, two streams ID1 and ID2 to the remote unit RU1, and allocates one stream ID3 or ID4 to each of the remaining remote units RU2 and RU3 according to the stream allocation algorithm in step 702.

The number of streams allocated to the remote unit RU1 is larger than that allocated to the remote units RU2 and RU3 for various reasons, for example, as in the following cases: (1) the mobile station UE1 is already in communication before the mobile stations UE2 and UE3, (2) the environment of the radio transmission path is better (or worse) in the mobile station UE1 than in the mobile stations UE2 and UE3, (3) the type of communication requires more resources in the mobile station UE1 than in the mobile stations UE2 and UE3, (4) the mobile station UE1 is a device (an administrator, a user of a special service, or the like) having priority over the mobile stations UE2 and UE3, and (5) the mobile station UE1 is a device having higher communication capability than the mobile stations UE2 and UE3 (for example, the mobile stations UE2 and UE3 are not capable of using two streams). It is conceivable to execute the stream allocation process of step 702 by weighting these conditions with priority.

Accordingly, the remote unit RU1 reports that the streams ID1 and ID2 are allocated to the mobile station UE1 in step 703, secures communication resources for the two streams (UL stream signals), and establishes a communication link for communicating with the mobile station UE1 using the two streams in accordance with a predetermined procedure. To be more specific, in order to receive the two UL stream signals, the remote unit RU1 forms two beams among the four beams that can be formed by the antenna AN1, that is, the beams respectively corresponding to the streams ID1 and ID2 in the direction toward the mobile station UE1.

Similarly, the remote unit RU2 reports that the stream ID3 is allocated to the mobile station UE2 in step 703, secures a communication resource for the one stream (UL stream signal), and establishes a communication link for communicating with the mobile station UE2 using the one stream in accordance with a predetermined procedure. To be more specific, in order to receive the one UL stream signal, the remote unit RU2 forms one beam among four beams that can be formed by the antenna AN2, that is, the beam corresponding to the stream ID3 in the direction toward the mobile station UE2.

Similarly, the remote unit RU3 reports that the stream ID4 is allocated to the mobile station UE3 in step 703, secures a communication resource for the one stream (UL stream signal), and establishes a communication link for communicating with the mobile station UE3 using the one stream in accordance with a predetermined procedure. To be more specific, in order to receive the one UL stream signal, the remote unit RU3 forms one beam among four beams that can be formed by the antenna AN3, that is, the beam corresponding to the stream ID4 in the direction toward the mobile station UE3.

On the other hand, in the master unit MU, the controller 100 generates the UL switching signals α, β, and γ based on the allocation of the two streams ID1 and ID2 to the mobile station UE1 and the allocation of one stream ID3 or ID4 to each of the mobile stations UE2 and UE3 in step 702.

At this time, the UL switching signal α is a signal for instructing the UL MUX SW 211 to output, to the addition processors 221 and 222, signals corresponding to the streams ID1 and ID2 among four signals input from the port ID1 and respectively corresponding to the four beams of the remote unit RU1.

On the other hand, the UL switching signal β is an instruction signal for causing the UL MUX SW 212 to output, to the addition processor 223, a signal corresponding to the stream ID3 without fail among four signals respectively corresponding to the four beams of the remote unit RU2 input from the port P2 and not to output some or all of the remaining three signals to the addition processors 221 to 224.

Similarly, the UL switching signal γ is an instruction signal for causing the UL MUX SW 213 to output, to the addition processor 223, a signal corresponding to the stream ID4 without fail among four signals respectively corresponding to the four beams of the remote unit RU3 input from the port P3 and not to output some or all of the remaining three signals to the addition processors 221 to 224.

That is, the UL switching signals α, β, and γ are signals including an instruction not to output some or all of the signals not used for communication to the addition processors 221 to 224.

As a result, the addition processors 221 and 222 output the signals of the two streams ID1 and ID2 of the remote unit RU1 input from the port P1 to the transfer unit 10, with little or no addition of signals from the other remote units RU2 and RU3.

Similarly, the addition processor 223 outputs the signal of the one stream ID3 of the remote unit RU2 input from the port P2 to the transfer unit 10, with little or no addition of signals from the other remote units RU1 and RU3.

Similarly, the addition processor 224 outputs the signal of the one stream ID4 of the remote unit RU3 input from the port P3 to the transfer unit 10, with little or no addition of signals from the other remote units RU1 and RU2.

That is, in the addition processors 221 to 224, addition of a signal that is not used for communication (a signal for which communication is not expected) to a signal that is actually used for communication is suppressed.

As described above, in the communication relay system having the aforementioned configuration, necessary stream allocation is autonomously performed for each remote unit, and each remote unit autonomously performs beam forming for the allocated stream in the distributed antenna system DAS including the remote units RU1 to RU3.

Therefore, according to the communication relay system having the aforementioned configuration, since the communication resource is allocated to each remote unit in accordance with the presence of the mobile station, it is possible to efficiently use the communication resources in the distributed antenna system DAS, which contributes to improvement in communication quality.

In addition, in the communication relay system having the aforementioned configuration, when the master unit MU that connects the remote units RU1 to RU3 to the base station apparatus gNB2 adds (combines) the reception signals by the remote units RU1 to RU3 and transfers the signals to the base station apparatus gNB2, some or all of the signals that are not used for communication (signals for which communication is not expected) are not added.

Therefore, according to the communication relay system having the aforementioned configuration, addition of unnecessary signal components to a signal transferred from the master unit MU to the base station apparatus gNB2 is suppressed, which suppresses NF degradation and contributes to improvement of a quality of communication.

The present invention is not limited to the embodiment described above and can be embodied in practice by modifying the structural elements without departing from the gist of the invention. In addition, various inventions can be made by suitably combining the structural elements disclosed in connection with the above embodiments. Furthermore, for example, a configuration may be considered in which some structural elements of all the structural elements described in the embodiment are deleted. Furthermore, structural elements of different embodiments may be suitably combined.

For example, in the aforementioned embodiment, the case where the base station apparatus gNB2 is directly connected to the distributed antenna system DAS has been described as an example. However, a relay for increasing the number of distributions may be provided between the base station apparatus gNB2 and the distributed antenna system DAS, and a plurality of distributed antenna systems DAS may be connected to the base station apparatus gNB2.

Furthermore, in the aforementioned embodiment, the controller 100 of the master unit MU determines a stream to be allocated to each of the remote units RU1 to RU3, but the embodiment is not limited thereto. For example, the controller included in each of the remote units RU1 to RU3 may determine the number of streams to be used by the remote unit based on the number of mobile stations UE located in the coverage area of the remote unit, the number of available streams reported from the master unit MU, or the like. Alternatively, the aforementioned relay may perform the same process as that of the controller 100, and may allocate a stream to each distributed antenna system DAS.

In the above embodiment, in the initial state of the control illustrated in FIG. 7, the master unit MU distributes and outputs the DL signal from the base station apparatus gNB2 to the remote units RU1 to RU3 for the downlink stream. However, as shown in FIGS. 5 and 6, the master unit MU has a function of selectively outputting a maximum of four DL signals transmitted from the base station apparatus gNB2 to arbitrary ports P1 to P3 according to the DL switching signals χ, ψ, and ω from the controller 100.

Therefore, for example, after the uplink stream allocation is performed by the stream allocation process of step 702, the same number of downlink streams may be allocated to the remote units (RU1 to RU3) to which the uplink streams are allocated with reference to the allocation result, and each of the remote units RU1 to RU3 may be caused to transmit the corresponding downlink streams.

It is needless to say that various modifications can be made without departing from the scope of the present invention.

While several embodiments have been described, these embodiments have been presented by way of example and are not intended to limit the scope of the invention. The novel embodiments described herein can be implemented in a variety of other forms; furthermore, various omissions, substitutions, and changes can be made without departing from the spirit of the invention. The embodiments and their modifications are included in the scope and spirit of the invention and are included in the scope of the claimed inventions and their equivalents.

What is claimed is:

1. A communication relay apparatus to which a plurality of remote units for performing radio communication with a mobile station are connectable and which is configured to transfer a signal transmitted from the mobile station through the remote units to a base station, the communication relay apparatus comprising:
   a detector configured to detect a mobile station located in a coverage area formed by each of the remote units; and
   a controller configured to control, for at least one of the plurality of remote units, a communication resource to be used by the at least one remote unit for communication with the mobile station based on a detection result of the detector,
   wherein the controller is further configured to allocate streams respectively to beams for beam forming and to perform an addition process for adding the allocated streams.

2. The communication relay apparatus according to claim 1, further comprising an acquirer configured to acquire information from a plurality of remote units,
   wherein the controller is configured to control, for at least one of the plurality of remote units, the communication resource to be used by the at least one remote unit for communication with the mobile station, based on the information acquired by the acquirer and the detection result of the detector.

3. A communication relay apparatus to which a plurality of remote units for performing radio communication with a mobile station are connectable and which is configured to transfer a signal transmitted from the mobile station through the remote units to a base station, the communication relay apparatus comprising:
   a receiver configured to receive a signal transmitted from each of the remote units;
   an adder configured to add signals received by the receiver to generate a signal to be transferred to the base station; and
   a controller configured to perform a control that causes the adder not to add a signal that is not used for communication among the signals received by the receiver, wherein the controller is further configured to allocate streams respectively to beams for beam forming and to perform an addition process for adding the allocated streams.

4. The communication relay apparatus according to claim 3, further comprising an acquirer configured to acquire information from the remote units,
wherein the controller is configured to perform the control that causes the adder not to add a signal that is not used for communication among the signals received by the receiver, based on the information acquired by the acquirer.

5. A non-transitory computer readable storage medium storing a computer program for a computer used in a communication relay apparatus to which a plurality of remote units for performing radio communication with a mobile station are connectable and which is configured to transfer a signal transmitted from the mobile station through the remote units to a base station, the computer program causing the computer to function as:
a detector configured to detect a mobile station located in a coverage area formed by each of the remote units; and
a controller configured to control, for at least one of the plurality of remote units, a communication resource to be used by the at least one remote unit for communication with the mobile station based on a detection result of the detector,
wherein the controller is further configured to allocate streams respectively to beams for beam forming and to perform an addition process for adding the allocated streams.

6. A non-transitory computer readable storage medium storing a computer program for a computer used in a communication relay apparatus to which a plurality of remote units for performing radio communication with a mobile station are connectable and which is configured to transfer a signal transmitted from the mobile station through the remote units to a base station, the computer program causing the computer to function as:
a receiver configured to receive a signal transmitted from each of the remote units;
an adder configured to add signals received by the receiver to generate a signal to be transferred to the base station; and
a controller configured to perform a control that causes the adder not to add a signal that is not used for communication among the signals received by the receiver,
wherein the controller is further configured to allocate streams respectively to beams for beam forming and to perform an addition process for adding the allocated streams.

\* \* \* \* \*